United States Patent [19]
Busse et al.

[11] 4,067,807
[45] Jan. 10, 1978

[54] PROCESS AND APPARATUS FOR THE OPERATION OF A FILTER PRESS HAVING A PRESSURE TANK COMMUNICATING THEREWITH

[75] Inventors: Oswald Busse; Hugo Klesper, both of Aarbergen, Germany

[73] Assignee: Passavant-Werke Michelbacher Hutte, Germany

[21] Appl. No.: 731,469

[22] Filed: Oct. 12, 1976

[30] Foreign Application Priority Data
Oct. 31, 1975 Germany .............................. 2548842

[51] Int. Cl.$^2$ .............................................. B01D 25/12
[52] U.S. Cl. ...................................... 210/82; 210/127; 210/225
[58] Field of Search ..................... 210/68, 79, 81, 82, 210/127, 136, 137, 224, 225

[56] References Cited
U.S. PATENT DOCUMENTS

| | | | |
|---|---|---|---|
| 3,015,395 | 1/1962 | Stram et al. | 210/225 X |
| 3,502,210 | 3/1970 | Busse et al. | 210/224 X |
| 3,522,881 | 8/1970 | Nicol | 210/127 |

*Primary Examiner*—John Adee
*Attorney, Agent, or Firm*—Woodford R. Thompson, Jr.

[57] ABSTRACT

A process and apparatus for operating a filter press having a sludge feed pump and a pressure tank in communication therewith wherein during filtration a quantity of sludge is withdrawn and stored in the pressure tank under a cushion of compressed air and wherein sludge is introduced under pressure from the pressure tank into the press during the next charging operation. A conduit having flow control means therein communicates the upper portion of the pressure tank with the press for injecting compressed air therein. The upper portion of the pressure tank also communicates with a compressed air supply conduit having flow control means therein which is controlled automatically as a function of the sludge level in the pressure tank.

8 Claims, 1 Drawing Figure

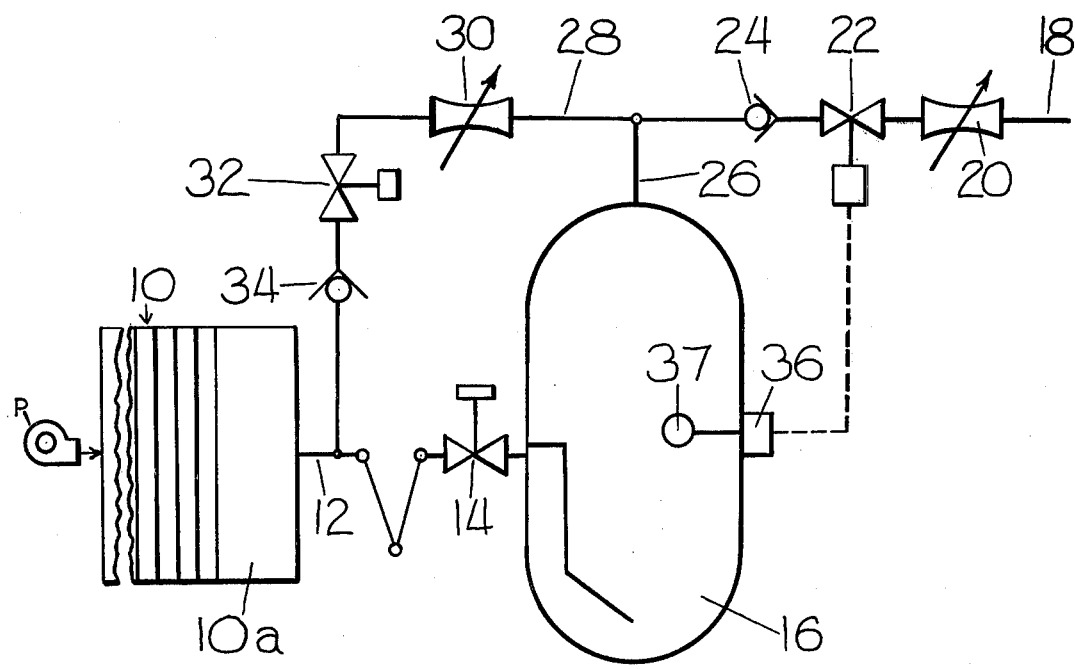

PROCESS AND APPARATUS FOR THE OPERATION OF A FILTER PRESS HAVING A PRESSURE TANK COMMUNICATING THEREWITH

BACKGROUND OF THE INVENTION

This invention relates to a method of operating a filter press having a pressure tank communicating therewith. During filtration part of the sludge being pumped under pressure to the filter press is conveyed to another location and is stored in a tank or suitable vessel under a cushion of compressed air. During the subsequent charging of the filter press the sludge thus stored is introduced into the filter press under the pressure of the compressed air and after each filtering operation, the filter press is blown clean by injection of compressed air. The invention further relates to apparatus for carrying out this operation. The method and apparatus are essentially but not exclusively applicable to filter presses employed in the dewatering of sewage sludges.

The above described process comprises storing under pressure a certain amount of sludge in a tank under a cushion of compressed air. When the press is charged the sludge thus pressurized and stored is immediately introduced into the filter press. Charging the press is thus considerably accelerated and made more uniform as compared to charging by means of a feed pump. During the filtration that follows, the charging part of the slurry is forced by the feed pump from the press unfiltered whereupon it is withdrawn from the press and stored in the tank under pressure for the next charge. An additional advantage is thus obtained in that the sludge introduced by the pump can be uniformly distributed in the press.

After each filtering operation and previous to the next charge, while the connecting valves between the filter press and the pressure tank are closed, the filter press is opened, the filter cake released and the filter cloth cleaned, if necessary. Before the filter press is opened any suspension still remaining therein should be removed to prevent it from oozing into the filter cake before the latter is removed. This is done by the injection of compressed air into the press, the compressed air is usually injected at the end of the press opposite the feed pump, so that the remaining suspension is returned to the sludge sump of the pump. Before the air is injected, the press may be rinsed with pressurized liquid.

The pressure that is eventually reached during storage of the sludge in the pressure tank corresponds to the delivery pressure of the feed pump and ranges usually from 10 to approximately 15 bars or atmospheres. This is the pressure at which the sludge has normally been fed to the filter press in the systems heretofore known to the art. It has been found that the rapid flow of sludge at such pressures is detrimental to the sludge flocs and especially to the filter cloth in that it reduces their service life. It is therefore an object of this invention to overcome this problem by reducing the velocity of the sludge flow to the press by means of a pressure tank in a simple manner and without wasting compressed air, as far as possible.

SUMMARY OF THE INVENTION

In accordance with our invention, the air injected to clean the press is withdrawn from the pressure tank. Accordingly, the high pressure built up in the tank during filtration in a simple manner is reduced prior to the next charge to a desirable degree, such as six bars or atmospheres which satisfies filtration conditions and above all does not damage the filter press. At the same time the compressed air needed for cleaning the press is easily made available. To avoid exposing the press to excessive pressure during air injection, the air taken from the pressure tank is reduced in pressure before being injected into the press.

In the event too much compressed air is used for injection into the press this could result in the pressure left in the tank being insufficient to recharge the press. Accordingly, a preferred embodiment of the invention provides for automatic replenishment of sufficient compressed air to maintain a constant minimum pressure while the press is being cleaned with compressed air. This automatic supply of compressed air has been employed in the withdrawal of sludge from the pressure tank but heretofore has not been employed in association with the withdrawal of compressed air from the tank.

The invention further relates to apparatus for carrying out the above described process wherein a filter press is connected at one end with a sludge feed pump and at the other end with a pressure tank having a compressed air conduit with flow control means therein through which compressed air is injected into the press. In accordance with our invention a further advantage is obtained in that the compressed air conduit communicates with the top of the pressure tank.

DESCRIPTION OF THE DRAWING

Apparatus embodying features of our invention and which may be employed to carry out our improved process is shown in the accompanying drawing, which is a schematic illustration of the apparatus.

DETAILED DESCRIPTION

One end of a filter press 10 is indicated by reference numeral 10$^a$. The other end of the filter press communicates with a feed pump P which charges the press with the suspension, slurry or similar matter to be dewatered, such as sewage sludge. The end 10$^a$ of the filter press 10 communicates by a conduit 12, having a control valve 14 therein, with a pressure tank 16. A compressed air conduit 18 supplies compressed air from a suitable source, not shown. An adjustable pressure reducing valve 20, a control valve 22 and a check valve 24 are provided in conduit 18 which communicates by a branch conduit 26 with the top of the pressure tank 16. As shown in the drawing, a conduit 28 having an adjustable reducing valve 30, a shutoff or control valve 32 and a check valve 34 communicates with conduits 18 and 26 and the conduit 12 or other suitable connection means disposed at the end 10$^a$ of the filter press 10. The shutoff or control valve 22 is operated by a float-controlled switch 36 mounted on the pressure tank 16 in such a manner that it closes when the float, indicated at 37, is in its lower position and opens automatically when the liquid level in the pressure tank 16 rises above a predetermined level. The air pressure applied to conduit 18 is approximately 15 bars or atmospheres.

The apparatus operates as follows: during filtration, the pressure tank 16 is gradually charged with suspension whereby the air above the suspension is compressed in proportion to the delivery pressure of the pump to the filter press. As soon as filtration is complete, the shutoff or control valve 14 is closed, whereupon the shutoff or control valve 32 is opened. Compressed air from the pressure tank 16 is thereby allowed to expand and to enter the filter press while its pressure is reduced by means of the reducing valve 30 to a predetermined constant pressure, such as 6 bars or atmospheres. When the filter press 10 has been sufficiently cleaned and/or the pressure in the tank 16 has decreased to a predetermined pressure, the valve 32 is closed. The filter press 10 is then opened, the filter cake removed and the filter and the filter cloth cleaned, whereupon the press is then closed again. To charge the filter press 10 at the beginning of a new filtration cycle, the shutoff valve 14 is opened and simultaneously the sludge feed pump is operated so that most of the contents of the pressure tank 16 is used to fill the filter press 10. The volume of the tank being double that of the filter press 10, filtration proper starts with the infeed of the second half of said contents, the rising pressure in the filter press 10 stops the flow of sludge from tank 16 to the press and eventually reverses it so that sludge is returned to the pressure tank 16 to be stored and pressurized therein.

Air in the tank 16 is replenished through the compressed air supply pipe 18 so that at a predetermined liquid level there is maintained a predetermined minimum pressure. The minimum pressure in tank 16 is controlled by means to the adjustable pressure reducing valve 20. The float-operated switch 36 provides the impulse for the admission of additional air to the tank 16 whereby the switch 36 together with the reducing valve 20 controls the shutoff or control valve 22. When the float 37 is in its lowermost position, the shutoff valve 22 is closed. When the liquid level rises above a predetermined level, the shutoff valve 22 is reopened. If the pressure in the tank 16 should at this time be below the preset pressure, it is immediately restored by the supply of compressed air from line 18. As the liquid level in the tank 16 rises the pressure therein continues to rise due to the fact that the check valve 24 prevents it from dropping.

The compressed air pipe 18 may also function as a stand-by supply of air for injection into the filter press 10 in case the air contained in the tank 16 is not sufficient and the pressure has dropped to the amount preset at the reducing valve 30. In this case compressed air will flow from pipe 18 to pipe 28, as the float-controlled switch 36 keeps the valve 22 open and the check valve 24 permits passage of air in that direction.

After air has been injected into the filter press 10 and prior to the next charging operation, the pressure preselected by means of the reducing valve 20 will be maintained in the tank 16, whereby charging of the press will start at this pressure. It should be noted that the pressure maintained in the tank 16 above the sludge level remains constant until the float-controlled switch 36 is operated due to the fact that air continues to flow through the open valve 22 into the pressure tank 16. Pressure will drop only when the liquid level in the tank 16 sinks below the float-controlled switch 36 and the latter closes the valve 22.

It will be obvious that many modifications and variations of the present invention are possible in view of the above disclosure.

What we claim is:

1. The method of operating a filter press having a pressure tank in communication therewith wherein during filtration sludge is introduced under pressure into one end of said filter press and a quantity of said sludge is withdrawn from the other end of said filter press and is transferred to and stored in said pressure tank under a cushion of compressed air which builds up inside said tank and wherein said sludge is introduced under pressure from said tank into said other end of said filter press during the next charging operation and the filter press is cleaned after each filtering cycle by injecting compressed air into the filter press at said other end thereof to transport any remaining sludge toward said one end of said filter press for removal thereat, the improvement comprising the step of deriving said compressed air injected into said other end of the filter press from said pressure tank.

2. The method as defined in claim 1 in which the pressure of said air derived from said pressure tank is reduced previous to the injection of said air into said filter press.

3. The method as defined in claim 1 in which the pressure inside said pressure tank is maintained above a predetermined minimum value by automatically supplying compressed air as air is injected into said filter press.

4. In apparatus for the operation of a filter press having a sludge feed pump communicating with one end of said press and a pressure tank communicating with the other end of said press wherein during filtration a quantity of said sludge is withdrawn from said other end and is stored in said pressure tank under a cushion of compressed air which builds up inside said tank and wherein said sludge is introduced under pressure from said tank into said filter press during the next charging operation, the improvement comprising:
   a. a conduit communicating the upper portion of said pressure tank with said other end of said press for injecting compressed air into said press after each filtering cycle to clean said press by transporting any remaining sludge toward said one end of the filter press for removal thereat, and
   b. control means in said conduit controlling the flow of compressed air to said press.

5. Apparatus as defined in claim 4 in which said conduit communicating the upper portion of said pressure tank with said other end of said press has a pressure reducing throttle valve therein.

6. Apparatus as defined in claim 4 in which the upper portion of said pressure tank is also in communication with a compressed air supply conduit and valve means in said compressed air supply conduit controls the flow of compressed air therethrough.

7. Apparatus as defined in claim 6 in which said compressed air supply conduit has a pressure reducing throttle valve therein.

8. Apparatus as defined in claim 6 in which said valve means is said compressed air supply conduit is controlled automatically as a function of the sludge level in said pressure tank.

* * * * *